United States Patent
Hao et al.

(10) Patent No.: US 11,050,511 B2
(45) Date of Patent: Jun. 29, 2021

(54) SIGNALING REGARDING RATE SPLITTING USING FIRST LAYERS AND SECOND LAYERS

(71) Applicant: QUALCOMM Incorporated, San Diego, CA (US)

(72) Inventors: Chenxi Hao, Beijing (CN); Yu Zhang, Beijing (CN); Chao Wei, Beijing (CN); Liangming Wu, Beijing (CN); Qiaoyu Li, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/048,837

(22) PCT Filed: Apr. 17, 2019

(86) PCT No.: PCT/CN2019/083001
§ 371 (c)(1),
(2) Date: Oct. 19, 2020

(87) PCT Pub. No.: WO2019/201267
PCT Pub. Date: Oct. 24, 2019

(65) Prior Publication Data
US 2021/0126739 A1 Apr. 29, 2021

(30) Foreign Application Priority Data

Apr. 20, 2018 (CN) .................. PCT/CN2018/083898

(51) Int. Cl.
*H04L 1/00* (2006.01)
*H04B 7/0413* (2017.01)

(52) U.S. Cl.
CPC ......... *H04L 1/0075* (2013.01); *H04B 7/0413* (2013.01)

(58) Field of Classification Search
CPC ............ H04L 5/0026; H04L 25/03929; H04L 1/0075; H04B 7/0413; H04B 17/309; H04B 7/0473; H04B 7/04; H04B 7/0478
See application file for complete search history.

(56) References Cited

U.S. PATENT DOCUMENTS

2018/0159707 A1* 6/2018 Onggosanusi ........ H04L 1/0026

FOREIGN PATENT DOCUMENTS

| CN | 102447522 A | 5/2012 |
|---|---|---|
| CN | 102771151 A | 11/2012 |

(Continued)

OTHER PUBLICATIONS

International Search Report and Written Opinion—PCT/CN2018/083898—ISA/EPO—dated Dec. 28, 2018.

(Continued)

*Primary Examiner* — Rahel Guarino
(74) *Attorney, Agent, or Firm* — QUALCOMM Incorporated

(57) ABSTRACT

Various aspects of the present disclosure generally relate to wireless communication. In some aspects, a user equipment (UE) may receive or determine information identifying a mapping of one or more codewords with regard to one or more layers, wherein the one or more layers include at least one of: a first set of layers, wherein a fraction of bits associated with each layer, of the first set of layers, is for data associated with the UE, or a second set of layers, wherein all bits associated with each layer, of the second set of layers, are for data associated with the UE; and perform rate matching or decoding based at least in part on the information identifying the mapping. Numerous other aspects are provided.

30 Claims, 9 Drawing Sheets

(56) References Cited

FOREIGN PATENT DOCUMENTS

| | | |
|---|---|---|
| CN | 107566100 A | 1/2018 |
| WO | 2008058112 | 5/2008 |
| WO | 2011137586 A1 | 11/2011 |
| WO | 2018001357 A1 | 1/2018 |

OTHER PUBLICATIONS

International Search Report and Written Opinion—PCT/CN2019/083001—ISA/EPO—dated Jul. 1, 2019.

* cited by examiner

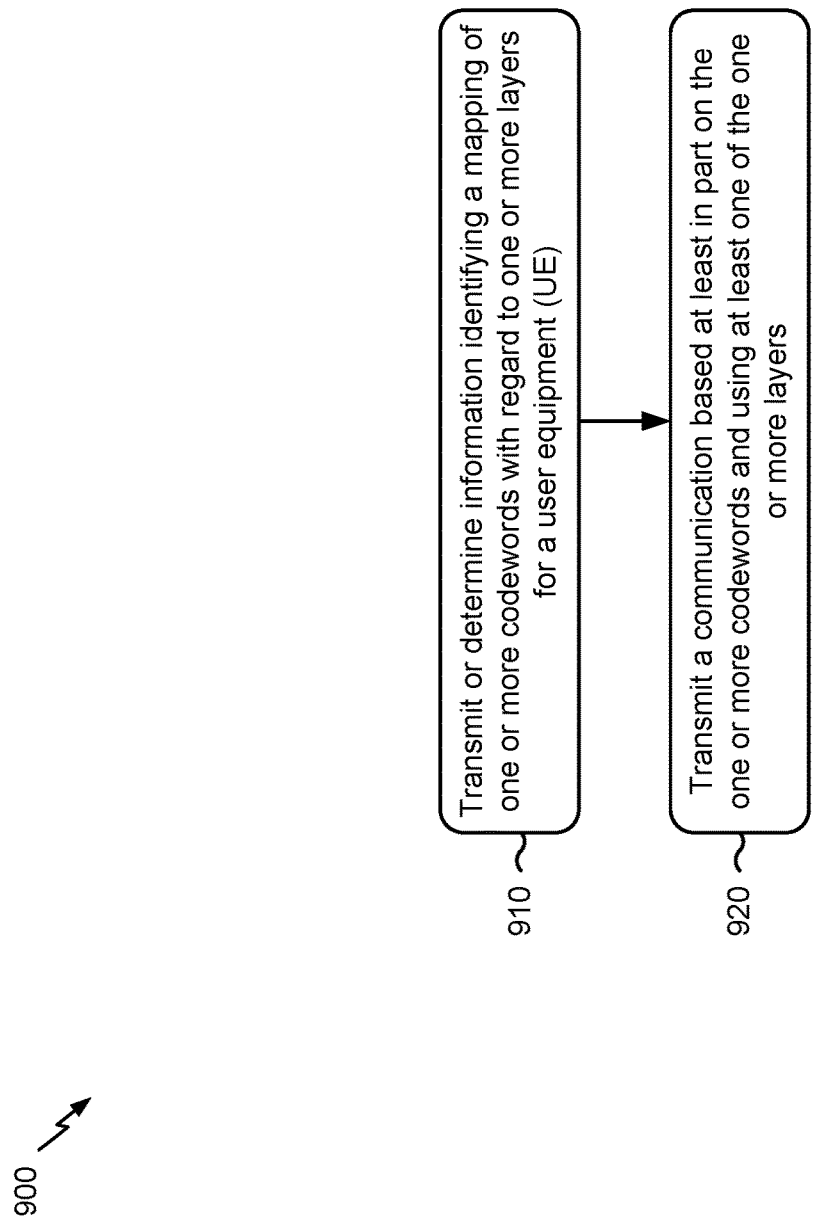

SIGNALING REGARDING RATE SPLITTING USING FIRST LAYERS AND SECOND LAYERS

CROSS-REFERENCE TO RELATED APPLICATIONS

This application is a 371 national stage of PCT Application No. PCT/CN2019/083001 filed on Apr. 17, 2019, entitled "SIGNALING REGARDING RATE SPLITTING USING FIRST LAYERS AND SECOND LAYERS," which claims priority to Patent Cooperation Treaty (PCT) Application No. PCT/CN2018/083898, filed on Apr. 20, 2018, entitled "TECHNIQUES AND APPARATUSES FOR SIGNALING REGARDING RATE SPLITTING USING FIRST LAYERS AND SECOND LAYERS," which are hereby expressly incorporated by reference herein.

FIELD OF THE DISCLOSURE

Aspects of the present disclosure generally relate to wireless communication, and more particularly to techniques and apparatuses for signaling regarding rate splitting using first layers and second layers.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long-Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving or determining information identifying a mapping of one or more codewords with regard to one or more layers, wherein the one or more layers include at least one of: a first set of layers, wherein a fraction of bits associated with each layer, of the first set of layers, is for data associated with the UE, or a second set of layers, wherein all bits associated with each layer, of the second set of layers, are for data associated with the UE; and performing rate matching or decoding based at least in part on the information identifying the mapping.

In some aspects, a UE for wireless communication may include memory and one or more processors operatively coupled to the memory. The memory and the one or more processors may be configured to receive or determine information identifying a mapping of one or more codewords with regard to one or more layers, wherein the one or more layers include at least one of: a first set of layers, wherein a fraction of bits associated with each layer, of the first set of layers, is for data associated with the UE, or a second set of layers, wherein all bits associated with each layer, of the second set of layers, are for data associated with the UE; and perform rate matching or decoding based at least in part on the information identifying the mapping.

In some aspects, a non-transitory computer-readable medium may store one or more instructions for wireless communication. The one or more instructions, when executed by one or more processors of a UE, may cause the one or more processors to receive or determine information identifying a mapping of one or more codewords with regard to one or more layers, wherein the one or more layers include at least one of: a first set of layers, wherein a fraction of bits associated with each layer, of the first set of layers, is for data associated with the UE, or a second set of layers, wherein all bits associated with each layer, of the second set of layers, are for data associated with the UE; and perform rate matching or decoding based at least in part on the information identifying the mapping.

In some aspects, an apparatus for wireless communication may include means for receiving or determining information identifying a mapping of one or more codewords with regard to one or more layers, wherein the one or more layers include at least one of: a first set of layers, wherein a fraction of bits associated with each layer, of the first set of layers, is for data associated with the UE, or a second set of layers, wherein all bits associated with each layer, of the second set of layers, are for data associated with the UE; and means for performing rate matching or decoding based at least in part on the information identifying the mapping.

In some aspects, a method of wireless communication, performed by a base station, may include transmitting or determining information identifying a mapping of one or more codewords with regard to one or more layers for a UE, wherein the one or more layers include at least one of: a first set of layers, wherein a fraction of bits associated with each layer, of the first set of layers, is for data associated with the UE, or a second set of layers, wherein all bits associated with each layer, of the second set of layers, are for data associated with the UE; and transmitting a communication based at least in part on the one or more codewords and using at least one of the one or more layers.

In some aspects, a base station for wireless communication may include memory and one or more processors operatively coupled to the memory. The memory and the one or more processors may be configured to transmit or determine information identifying a mapping of one or more codewords with regard to one or more layers for a UE, wherein the one or more layers include at least one of: a first set of layers, wherein a fraction of bits associated with each layer, of the first set of layers, is for data associated with the UE, or a second set of layers, wherein all bits associated with each layer, of the second set of layers, are for data associated with the UE; and transmit a communication based at least in part on the one or more codewords and using at least one of the one or more layers.

In some aspects, a non-transitory computer-readable medium may store one or more instructions for wireless communication. The one or more instructions, when executed by one or more processors of a base station, may cause the one or more processors to transmit or determine information identifying a mapping of one or more codewords with regard to one or more layers for a UE, wherein the one or more layers include at least one of: a first set of layers, wherein a fraction of bits associated with each layer, of the first set of layers, is for data associated with the UE, or a second set of layers, wherein all bits associated with each layer, of the second set of layers, are for data associated with the UE; and transmit a communication based at least in part on the one or more codewords and using at least one of the one or more layers.

In some aspects, an apparatus for wireless communication may include means for transmitting or determining information identifying a mapping of one or more codewords with regard to one or more layers for a UE, wherein the one or more layers include at least one of: a first set of layers, wherein a fraction of bits associated with each layer, of the first set of layers, is for data associated with the UE, or a second set of layers, wherein all bits associated with each layer, of the second set of layers, are for data associated with the UE; and means for transmitting a communication based at least in part on the one or more codewords and using at least one of the one or more layers.

Aspects generally include a method, apparatus, system, computer program product, non-transitory computer-readable medium, user equipment, base station, wireless communication device, transmitter device, receiver device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 9 is a diagram illustrating an example process performed, for example, by a base station, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G/NR and later.

Figure 1:
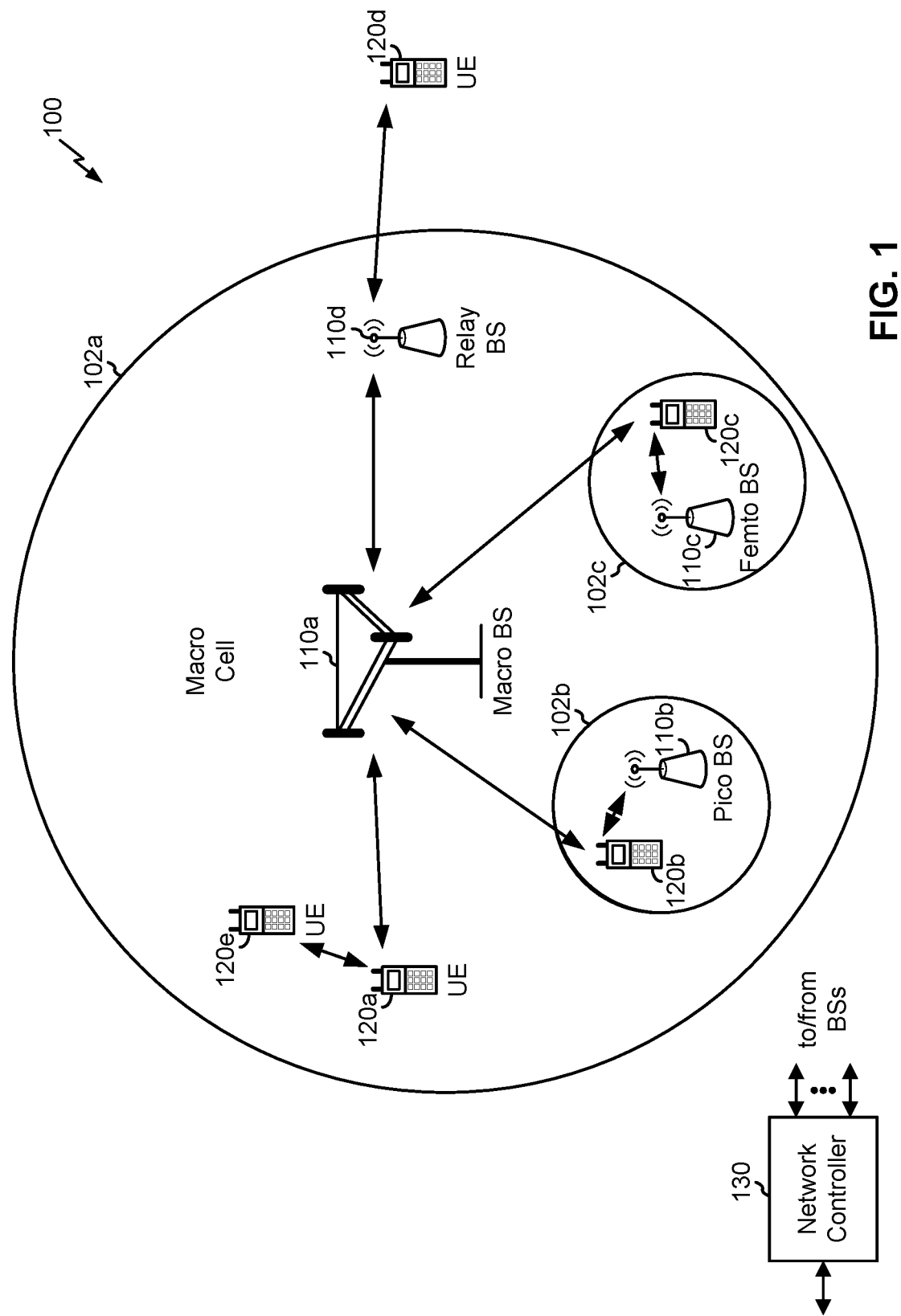
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, a biometric sensor or device, a wearable device (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a BS 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the BS 110.

As indicated above, FIG. 1 is provided merely as an example. Other examples may differ from what is described with regard to FIG. 1.

Figure 2:
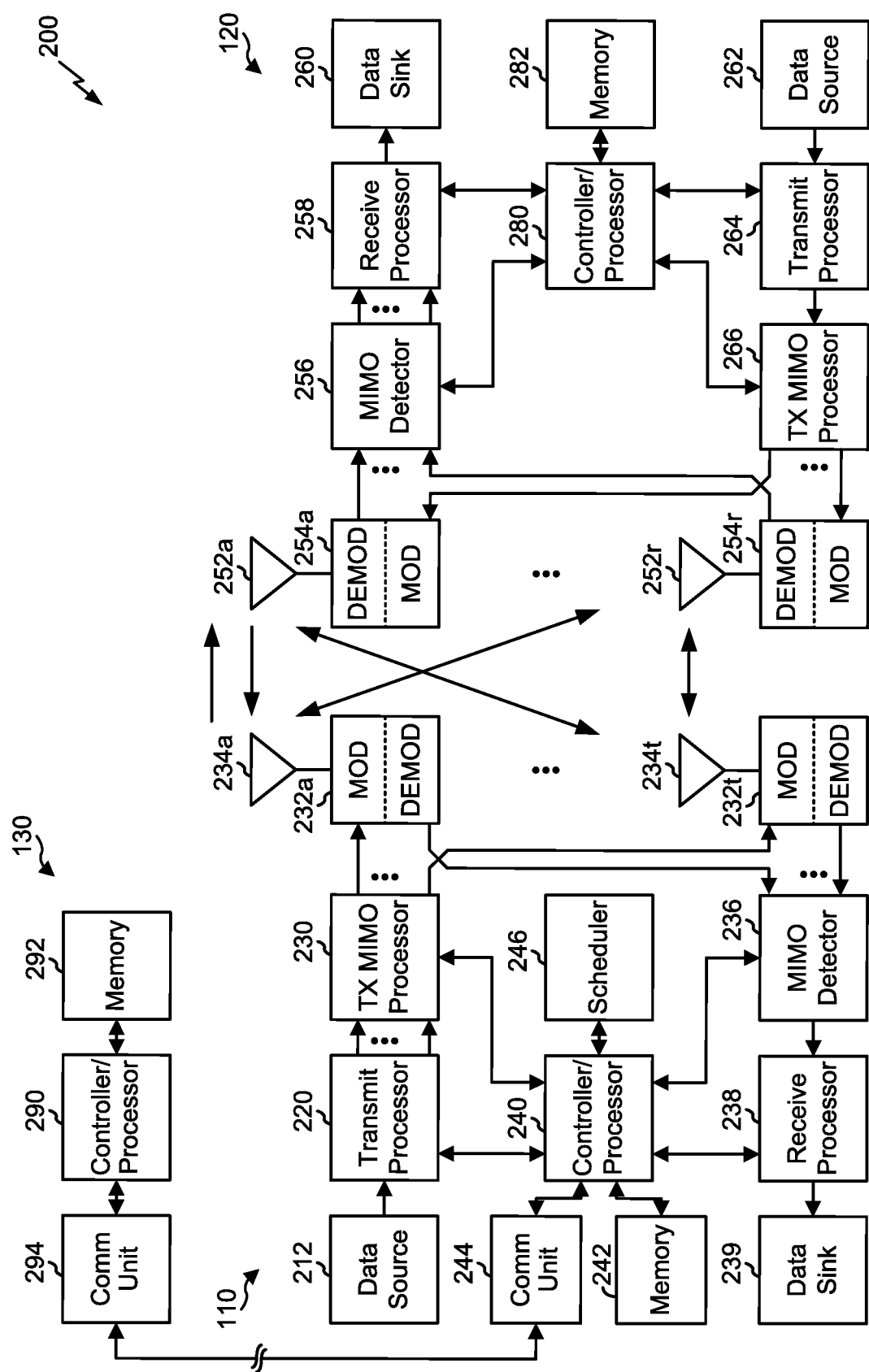
FIG. 2 is a block diagram conceptually illustrating an example of a base station in communication with a UE in a wireless communication network, in accordance with various aspects of the present disclosure.

FIG. 2 shows a block diagram of a design 200 of BS 110 and UE 120, which may be one of the base stations and one of the UEs in FIG. 1. BS 110 may be equipped with T antennas 234*a* through 234*t*, and UE 120 may be equipped with R antennas 252*a* through 252*r*, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from BS 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of BS 110, controller/processor 280 of UE 120, and/or any other component(s) of FIG. 2 may perform one or more techniques associated with signaling for rate splitting using first layers and second layers, as described in more detail elsewhere herein. For example, controller/processor 240 of BS 110, controller/processor 280 of UE 120, and/or any other component(s) of FIG. 2 may perform or direct operations of, for example, process 900 of FIG. 9 and/or other processes as described herein. Memories 242 and 282 may store data and program codes for BS 110 and UE 120, respectively. A scheduler 246 may schedule UEs for data transmission on the downlink and/or uplink.

In some aspects, a receiver device, such as UE 120, may include means for receiving or determining information identifying a mapping of one or more codewords with regard to one or more layers, wherein the one or more layers include at least one of: a first set of layers, wherein a fraction of bits associated with each layer, of the first set of layers, is for data associated with the UE, or a second set of layers, wherein all bits associated with each layer, of the second set of layers, are for data associated with the UE; and means for performing rate matching or decoding based at least in part on the information identifying the mapping; means for determining the mapping based at least in part on the mode indicator and a number of layers of the one or more layers; means for determining the mapping based at least in part on a configuration; means for determining the mapping based at least in part on one or more values that explicitly identify the mapping; and/or the like. In some aspects, such means may include one or more components of UE 120 described in connection with FIG. 2.

In some aspects, a transmitter device, such as BS 110, may include means for transmitting or determining information identifying a mapping of one or more codewords with regard to one or more layers for a UE, wherein the one or more layers include at least one of: a first set of layers, wherein a fraction of bits associated with each layer, of the first set of layers, is for data associated with the UE, or a second set of layers, wherein all bits associated with each layer, of the second set of layers, are for data associated with the UE; means for transmitting a communication based at least in part on the one or more codewords and using at least one of the one or more layers; and/or the like. In some aspects, such means may include one or more components of BS 110 described in connection with FIG. 2

As indicated above, FIG. 2 is provided merely as an example. Other examples may differ from what is described with regard to FIG. 2.

Multi-user multiple-input multiple-output (MU-MIMO) can be used to transmit data to different UEs (e.g., UE 120) simultaneously using the same frequency resource. For example, a transmitted signal may include a first part (e.g., channel) for a first UE, a second part for a second UE, and so on. In this scenario, each UE not only receives the desired signal, but also overhears the signal intended to other UEs on the same time-frequency resource. Since UEs may not be able to cooperate with each other, how to deal with the overheard inter-user interference is an issue. In some aspects, a MU-MIMO signal may be constructed to perform interference rejection at the transmitter (e.g., using zero-forcing beamforming or a similar technique). In such a case, performance may be ideal (e.g., improved, optimal, etc.) when channels for the users are orthogonal and the transmitter obtains knowledge (e.g., perfect knowledge) of the channel state information (CSI). In some aspects, a MU-MIMO signal may be constructed through superposition coding. In such a case, the data intended for each UE are transmitted using a common precoder, and power levels of signals of the UEs may be different. The stronger UE (i.e., the UE with a higher channel gain) is able to decode the data intended to weaker UE(s), and then decode the desired data by cancelling the interference. The weaker UE may decode its desired data by treating the inter-user interference as noise because the weaker UE is incapable of decoding the inter-user interference. Superposition coding may provide ideal performance (e.g., improved, optimal, etc.) when the UEs are collocated (i.e., UEs are not separable in spatial domain or there is only one single antenna at the transmitter).

However, interference rejection at the transmitter may rely on high accuracy of channel state information and spatial separation of the UEs to deliver adequate performance, and interference decoding at the UE may provide ideal performance only when UEs are spatially aligned. Furthermore, interference rejection, when taken alone, may not be compatible with massive MIMO.

Some techniques and apparatuses described herein provide transmission of data for UEs using at least one first layer, transmitted without interference rejection (e.g., using superposition coding), which each recipient UE is able to detect and decode (e.g., a common part), and at least one second layer, transmitted via interference rejection, that only a corresponding UE is to decode (e.g., a private part or a UE-specific part). By transmitting using a combination of interference rejection and superposition coding, performance may be maintained for UEs irrespective of whether the UEs are collocated or spatially aligned. Thus, performance of MU-MIMO may be improved and throughput may be maintained irrespective of whether the UEs are collocated or spatially aligned.

Furthermore, some techniques and apparatuses described herein may provide signaling of information used to process signals including first layers and second layers. For example, to successfully extract information provided to a UE using a first layer and/or a second layer, the UE may need to know one or more of: which layers are first layers; a number of first layers provided by the BS; a number of total layers provided by the BS; a fraction or partition of data to be extracted from a first layer; modulation information for one or more layers; a modulation constellation for one or more layers; and/or the like. Some techniques and apparatuses described herein provide the signaling of such information and/or for rate matching and/or decoding of signals by the UE based at least in part on such information. Thus, flexibility and efficiency of provision of signals including first parts and second parts is improved by providing for signaling or configuration of rate matching or decoding of such signals.

As used herein, "bit" or "codeword" may refer to a coded code block or codeword or an uncoded codeblock or codeword.

FIGS. 3-6 are described with reference to a BS 110 and two or more UEs 120 (sometimes referred to as UE 1 and UE 2 for brevity). However, the processes and techniques described with regard to FIGS. 3-6 may be performed by any transmitter device (e.g., for FIGS. 3 and 5) and any receiver device (e.g., for FIGS. 4 and 6). For example, the transmitter device may include a BS 110, a UE 120, or another type of device. Similarly, the receiver device may include a BS 110, a UE 120, or another type of device.

Figure 3:
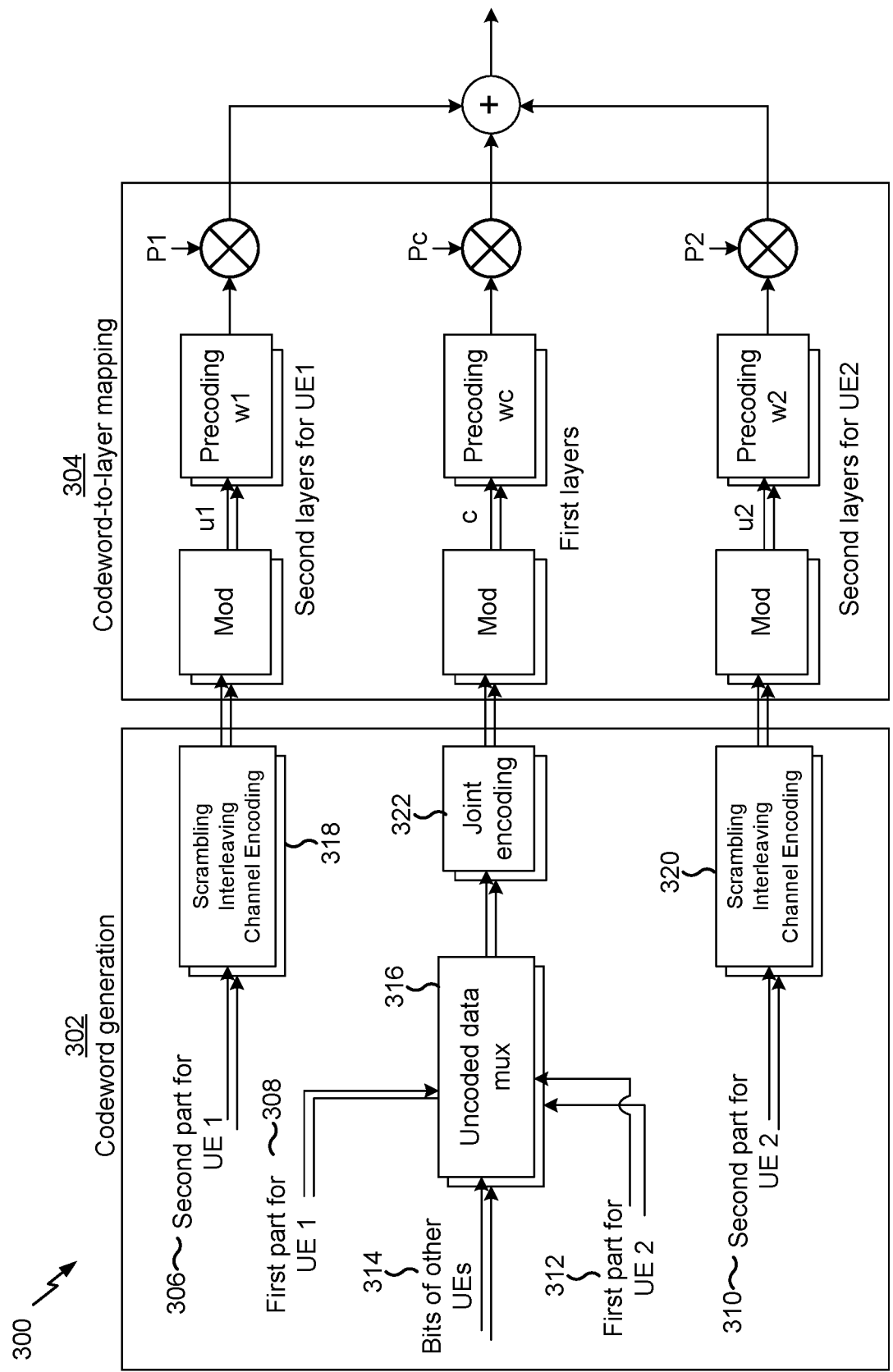
FIG. 3 is a diagram illustrating an example of operations performed by a transmitter device to transmit communications using at least one first layer and/or at least one second layer that are formed by multiplexing data of different UEs before channel coding, in accordance with various aspects of the present disclosure.

FIG. 3 is a diagram illustrating an example 300 of operations performed by a transmitter device to transmit communications using at least one first layer and/or at least one second layer that are formed by multiplexing data of different UEs before channel coding, in accordance with various aspects of the present disclosure. The operations described in connection with FIG. 3 may be performed by a transmitter device (e.g., BS 110 or UE 120).

As shown in FIG. 3, and by reference number 302, the transmitter device may perform codeword generation operations to generate codewords to be mapped to layers (e.g., first layers and/or second layers). As shown by reference number 304, the transmitter device may perform codeword-to-layer mapping to map the codewords to first layers and/or second layers for transmission to a receiver device (e.g., BS 110 or UE 120).

As shown by reference number 306, the transmitter device may receive or generate a second part (e.g., a data stream, a part of a data stream, a codeword, a set of codewords, etc.) for a first UE (e.g., UE 1). As shown by reference number 308, the transmitter device may receive or generate a first part (e.g., a data stream, a part of a data stream, a codeword, a set of codewords, etc.) for the first UE. For example, the first bits may include some of or all of the second bits and/or may include information other than information included in the second bits. As shown by reference number 310, the transmitter device may receive or generate a second part for a second UE (e.g., UE 2). As shown by reference number 312, the transmitter device may receive or generate data for a first part for the second UE. As shown by reference number 314, in some aspects, the transmitter may receive or generate data for UEs other than the first UE or the second UE (e.g., shown as "bits of other UEs").

As shown by reference number 316, the transmitter device may multiplex the first bits of UE 1, UE 2, and the other UEs (when present). For example, the transmitter device may multiplex the first bits to form a first part to be mapped to one or more first layers. The transmitter device may use any multiplexing scheme to multiplex the first bits (e.g., localized multiplexing, a comb-based multiplexing technique, etc.). In this case, the transmitter device multiplexes the first bits before the first bits are encoded to generate codewords.

As shown by reference number 318, the transmitter device may perform scrambling, interleaving, and channel encoding for the second part of the first UE. As shown by reference number 320, the transmitter device may perform scrambling, interleaving, and channel encoding for the second part of the second UE.

As shown by reference number 322, the transmitter device may perform joint channel encoding of the first parts of the UEs. As further shown, the transmitter device may perform codeword-to-layer mapping. The first parts are mapped to first layers, while the second parts are mapped to second layers. Afterwards, the transmitter device may perform precoding (e.g., using w1 for the second layer of UE 1, w2 for the second layer of UE 2, and wc for the first layer of the UEs), and may apply respective power levels (e.g., P1 for the second layer of UE 1, P2 for the second layer of UE 2, and Pc for the first layer of the UEs), as described above. Thus, the transmitter device enables joint unicasting of second parts and multicasting of first parts, thereby improving throughput and performance for collocated receiver devices.

As indicated above, FIG. 3 is provided as an example. Other examples may differ from what is described with respect to FIG. 3.

Figure 4:
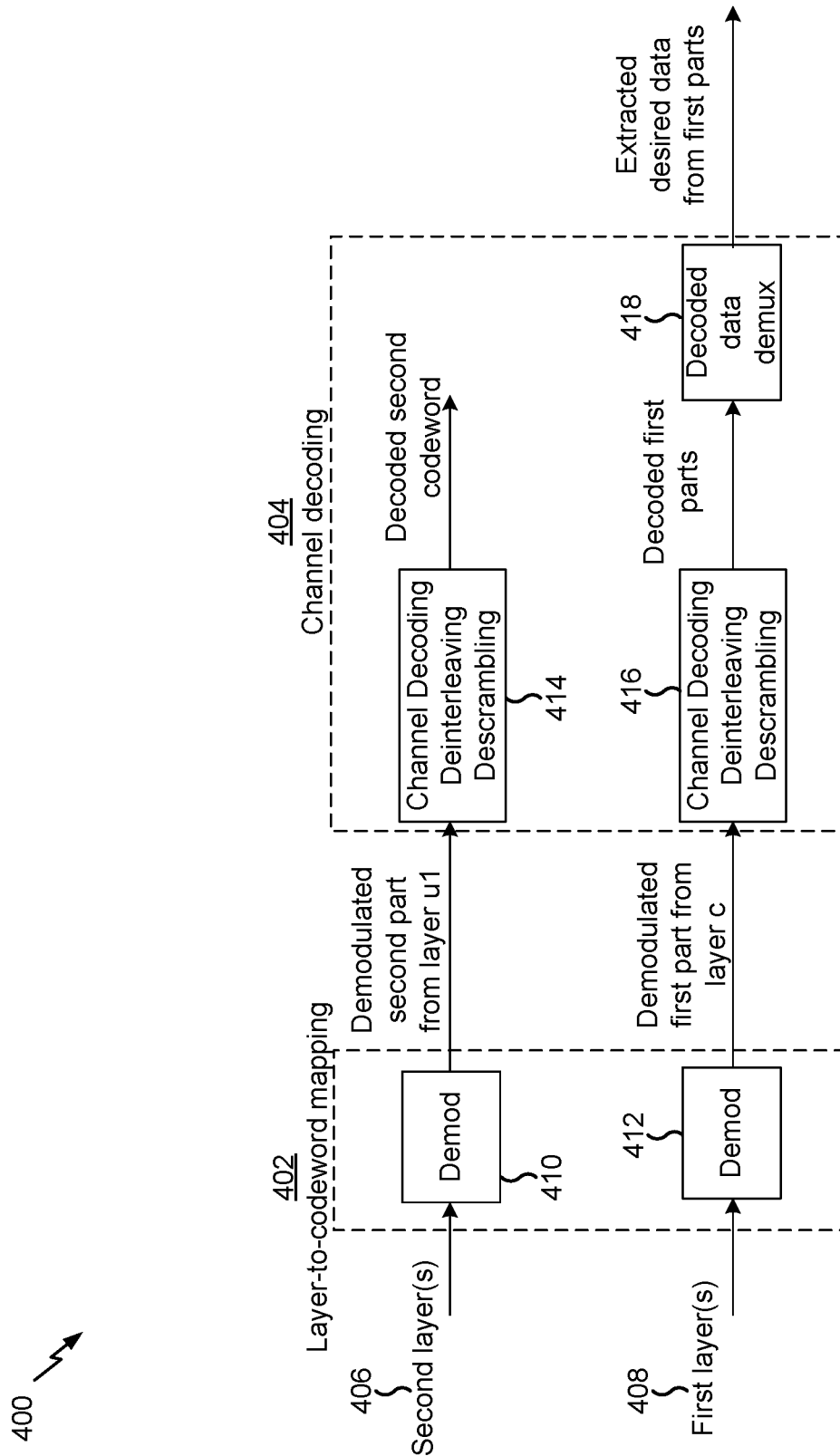
FIG. 4 is a diagram illustrating an example of operations performed by a receiver device to receive communications using at least one first layer and/or at least one second layer that are formed by multiplexing data of different UEs data before channel coding, in accordance with various aspects of the present disclosure.

FIG. 4 is a diagram illustrating an example 400 of operations performed by a receiver device to receive communications using at least one first layer and/or at least one second layer that are formed by multiplexing data of different UEs data before channel coding, in accordance with various aspects of the present disclosure. The receiver device described in connection with FIG. 4 may perform layer-to-codeword mapping (shown by reference number 402) and channel decoding (shown by reference number 404) based at least in part on one or more first layers and one or more second layers.

As shown by reference number 406, a receiver device may receive one or more second layers, and, as shown by reference number 408, the receiver device may receive one or more first layers. Here, the one or more second layers are associated with the receiver device. In some aspects, the receiver device may receive another second layer that is not associated with the receiver device (e.g., that is associated with another receiver device). In such a case, the receiver device may discard the other second layer, may perform interference detection to cancel the other second layer, and/or the like. Here, the one or more first layers include information associated with the receiver device and one or more other receiver devices.

As shown by reference number 410, the receiver device may demodulate the second layer to obtain desired data associated with the receiver device. As shown by reference number 412, the receiver device may demodulate the first layer to obtain data associated with the receiver device and the one or more other receiver devices. In some aspects, the receiver device may demodulate constellation symbols of the second layer and/or the first layer based at least in part on configuration information indicating a constellation (e.g., a modulation constellation) associated with the first layer and/or the second layer. For example, the configuration information may indicate constellations associated with all layers, a respective constellation associated with each layer, a constellation associated with a particular codeword or set of codewords, and/or the like. The receiver device may demodulate the constellation symbols of the first layer and/or the second layer based at least in part on the configuration information.

In some aspects, the receiver device may demodulate, decode, deinterleave, and/or descramble the first layer and/or the second layer based at least in part on information identifying a mapping of codewords to layers. For example, the information identifying the mapping may indicate whether the receiver device is to receive one or more first layers, may indicate which codewords are to be mapped to particular layers, may indicate a ratio or fraction of bits to be extracted from a first layer, and/or the like.

As shown by reference number 414, the receiver device may perform channel decoding, deinterleaving, and/or descrambling on the second part of the receiver device to obtain decoded second information of the receiver device. In this way, the receiver device obtains data provided to the receiver device via a second layer.

As shown by reference number 416, the receiver device may perform channel decoding, deinterleaving, and descrambling on the demodulated data provided via a first layer. For example, the receiver device may perform channel decoding to obtain decoded data provided via a first layer. The decoded data provided via a first layer may include codewords pertaining to multiple, different receiver devices. For example, a first part of a codeword may pertain to a first receiver device, and a second part of the codeword may pertain to a second receiver device. In some aspects, a first codeword of the decoded first part may pertain to a first receiver device and a second codeword of the decoded data may pertain to a second receiver device.

As shown by reference number 418, the receiver device may demultiplex the decoded data. For example, and as shown, the receiver device may extract desired data (e.g., data pertinent to the receiver device) from the decoded data. In some aspects, the receiver device may extract the desired data based at least in part on information identifying a fraction or ratio of bits of the codewords to be extracted. In some aspects, the fraction or ratio may be received from the transmitter device. In this way, the receiver device may extract desired data from the entire second layer, and may extract desired data, relevant to the receiver device, from a first layer based on the configured ratio or fraction. Thus, the performance of MIMO communication with the receiver device is improved irrespective of whether the receiver device is collocated or spatially separate from other receiver devices.

As indicated above, FIG. 4 is provided as an example. Other examples may differ from what is described with respect to FIG. 4.

Figure 5:
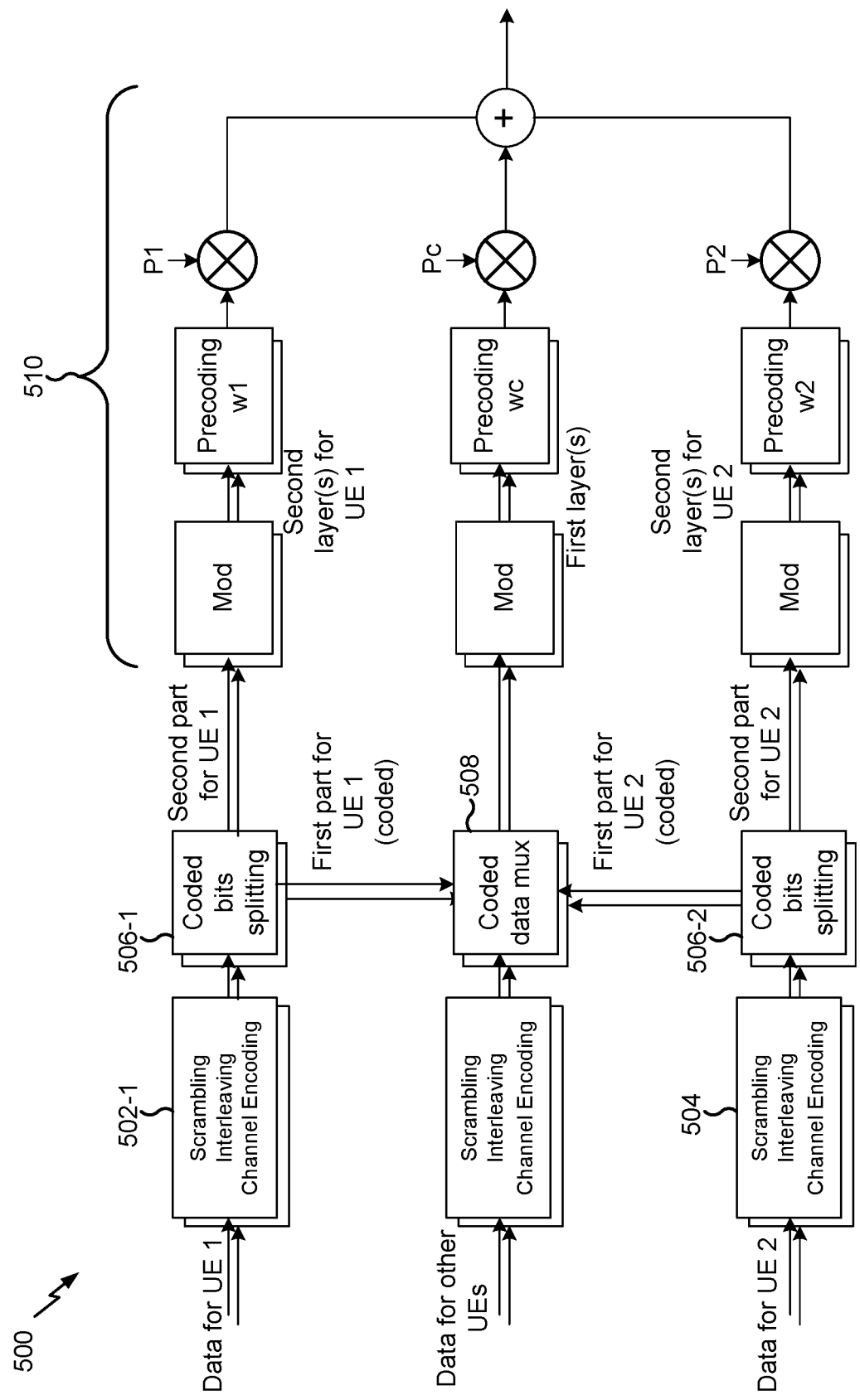
FIG. 5 is a diagram illustrating an example of operations performed by a transmitter device to transmit communications using at least one first layer and/or at least one second layer that are formed using coded bits, in accordance with various aspects of the present disclosure.

FIG. 5 is a diagram illustrating an example 500 of operations performed by a transmitter device to transmit communications using at least one first layer and/or at least one second layer that are formed using coded bits, in accordance with various aspects of the present disclosure. In some aspects, the operations described in FIG. 5 may be performed by a transmitter device (e.g., BS 110, UE 120, etc.).

As shown in FIG. 5, and by reference numbers 502 and 504, the transmitter device may receive or generate data for UE 1 and UE 2 (e.g., receiver devices). As further shown, the transmitter device may receive or generate data for one or more other UEs (e.g., one or more receiver devices). In some aspects, the transmitter device may perform scrambling, interleaving, and channel coding to generate codewords or coded bits or coded data.

As shown by reference numbers 506-1 and 506-2, the transmitter device may perform rate splitting of the coded bits of the data for UE 1 and UE 2. For example, the data of UE1 and UE2 may be split into a first part and a second part, wherein the first parts are multiplexed together. In some aspects, when there are first parts of other UEs to be transmitted, the first parts of the other UEs and the first parts of UE 1 and UE 2 are multiplexed.

As shown by reference number 508, the transmitter device may multiplex the coded first part for UE 1, UE 2, and the other UEs (when present) to generate a first part for the first layer. For example, the transmitter device may multiplex the codewords or the portions of codewords associated with each UE of UE 1, UE 2, and the other UEs after the data associated with UE 1, UE 2, and the other UEs is encoded. In some aspects, the transmitter device may provide particular codewords or portions of codewords, of the coded data for a UE, as the coded first part. In some aspects, the transmitter device may explicitly or implicitly provide information regarding how the multiplexing is performed (e.g., the fraction of bits to be extracted from at least one first layer for each UE), and/or information regarding which codeword is to be mapped to each first layer.

As shown by reference number 510, the transmitter device may perform modulation, precoding, and power allocation of the second layers for UE 1, the second layers for UE 2, and the first layers for UE 1, UE 2, and/or the other UEs. These operations may be similar to the modulation, precoding, and amplification for second layers and first layers described in connection with FIG. 3, above. For example, the transmitter device may transmit, to the UEs, information to identify constellations to be used for the first layers and/or the second layers.

As indicated above, FIG. 5 is provided as an example. Other examples may differ from what is described with respect to FIG. 5.

Figure 6:
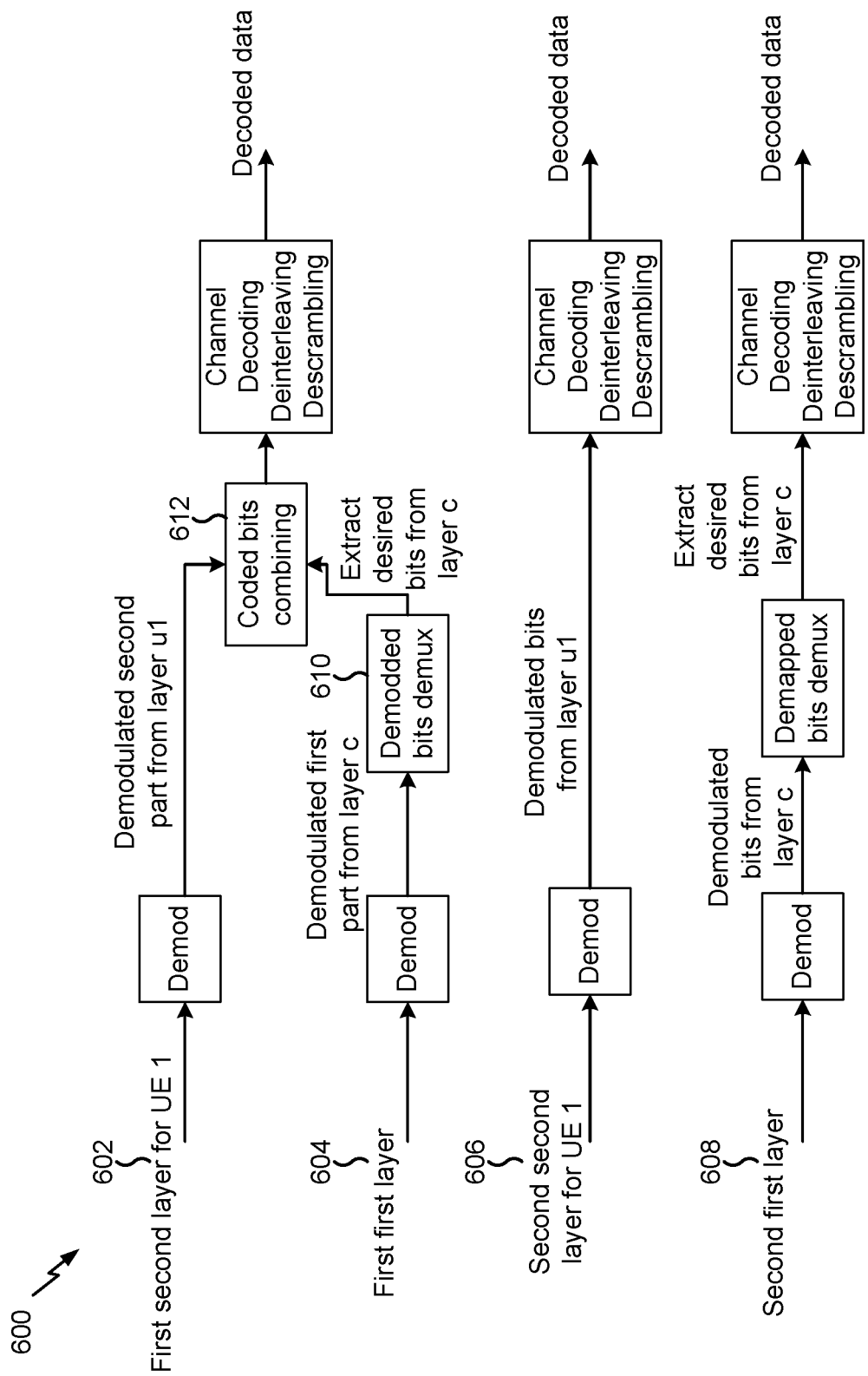
FIG. 6 is a diagram illustrating an example of operations performed by a receiver device to receive communications using at least one first layer and/or at least one second layer that are formed using coded bits, in accordance with various aspects of the present disclosure.

FIG. 6 is a diagram illustrating an example 600 of operations performed by a receiver device to receive communications using at least one first layer and/or at least one second layer that are formed using coded bits, in accordance with various aspects of the present disclosure. In some aspects, the operations described in FIG. 6 may be performed by a receiver device (e.g., BS 110, UE 120, and/or the like). In FIG. 6, the receiver device is referred to as UE 1.

As shown in FIG. 6, and by reference number 602, the receiver device may receive a first second layer for the receiver device (e.g., UE 1). As shown by reference number 604, the receiver device may receive a first first layer. For the purpose of FIG. 6, assume that a particular codeword is mapped to the first second layer and the first first layer. For example, a first portion of the particular codeword may be mapped to the first second layer, and a second portion of the particular codeword may be mapped to the first first layer. Furthermore, the second portion of the particular codeword may be multiplexed with portions of codewords associated with other receiver devices in the first layer. A description of demultiplexing, combining, and decoding the first second layer and the first first layer (in connection with reference numbers 610 and 612) follows the description of reference numbers 606 and 608, below.

As shown by reference number 606, the receiver device may receive a second second layer for the receiver device. The second second layer may be not associated with a codeword that is also mapped to a first layer. Therefore, the receiver device may demodulate, decode, deinterleave, and descramble the second second layer to obtain second part for the receiver device, as described in more detail elsewhere herein.

As shown by reference number 608, the receiver device may receive a second first layer. In some aspects, the second first layer may be a different first layer than the first first layer. In some aspects, the second first layer and the first first layer may be the same first layer. In other words, the same first layer may include one or more codewords that are also mapped to the first second layer and one or more codewords that are not mapped to the first second layer. As further shown, the receiver device may demodulate, demultiplex, decode, deinterleave, and descramble the second first layer, as described in more detail elsewhere herein, to obtain first part associated with the receiver device. In some aspects, in the demultiplexing operation, the receiver device may extract the desired data based at least in part on information used for identifying which fraction of data is to be extracted from the second first layer.

As shown by reference number 610, the receiver device may demodulate the first first layer (e.g., based at least in part on information identifying a constellation associated with the first first layer), and may demultiplex the demodulated data of the first first layer. For example, the receiver device may demultiplex the demodulated data to obtain the second portion of the particular codeword that is mapped to the first first layer, as described above. In some aspects, the receiver device may demultiplex the demodulated data based at least in part on information identifying a mapping of codewords to layers that indicates that the second portion of the particular codeword is mapped to the first first layer. In some aspects, the receiver device may extract the desired demodulated data based at least in part on information identifying which fraction of data is to be extracted from the first first layer. As further shown, by demultiplexing the first first layer, the receiver device may obtain desired data (e.g., desired bits) from the first first layer (e.g., layer c).

As shown by reference number 612, the receiver device may combine the demodulated second part from the second layer (e.g., layer u1) and the desired bits from the first first layer (e.g., layer c). For example, the receiver device may combine the first portion of the particular codeword and the second portion of the particular codeword to form the particular codeword. As further shown, the receiver device may perform channel decoding, deinterleaving, and descrambling to obtain decoded data. In this way, the receiver device may receive data over a combination of the first second layer and the first first layer, which improves versatility of encoding of data for the receiver device and which may improve throughput of the receiver device.

In some aspects, there may be a third first layer as part of the encoded communication. After extracting desired demodulated data from the third first layer, the desired demodulated data may be a third portion of a particular codeword. The receiver device may combine the third portion with data from a first second layer and a first first layer.

As indicated above, FIG. 6 is provided as an example. Other examples may differ from what is described with respect to FIG. 6.

Figure 7:
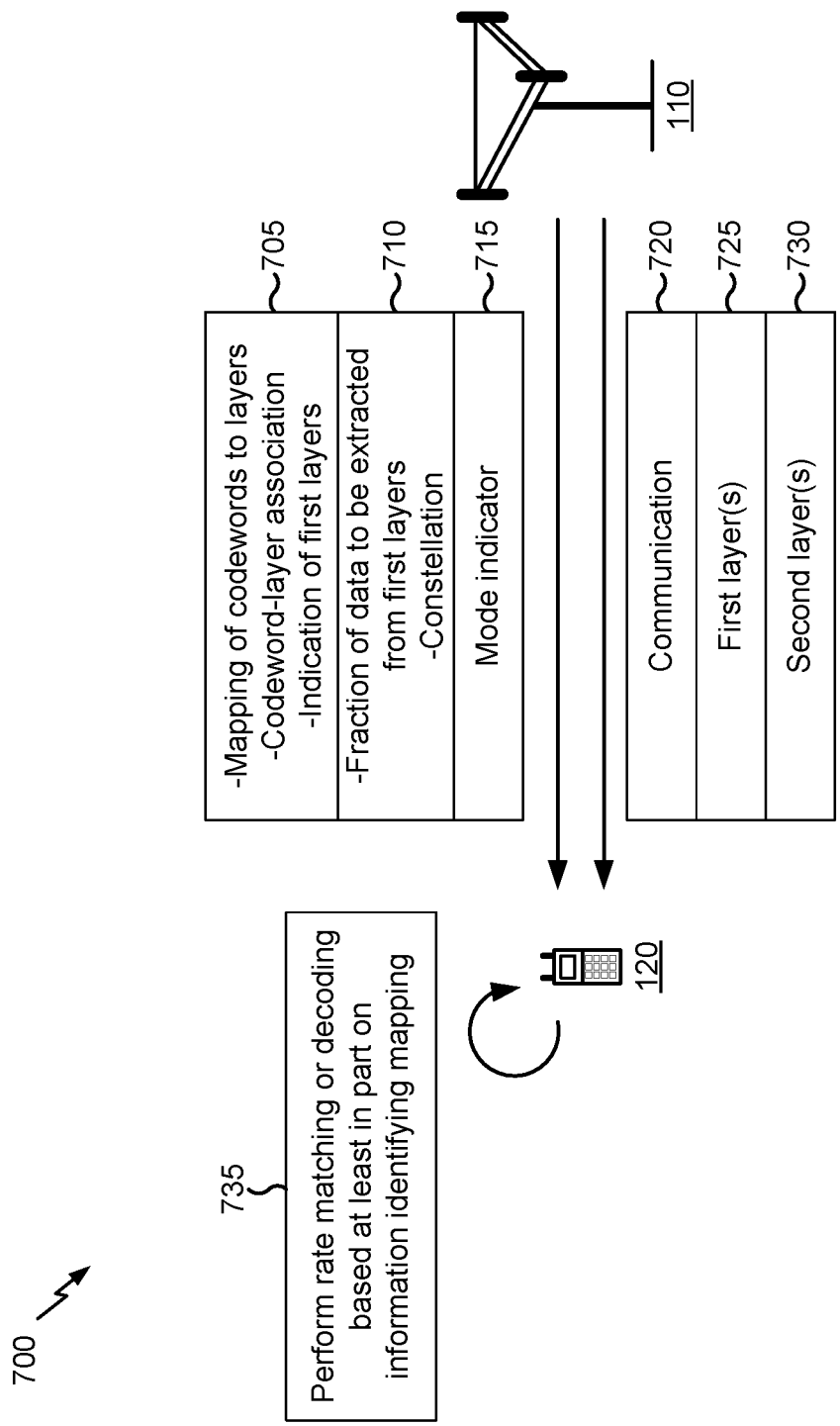
FIG. 7 is a diagram illustrating an example of signaling regarding rate splitting using first layers and second layers, in accordance with various aspects of the present disclosure.

FIG. 7 is a diagram illustrating an example 700 of signaling regarding rate splitting using first layers and second layers, in accordance with various aspects of the present disclosure.

As shown in FIG. 7, and by reference number 705, a BS 110 (e.g., a transmitter device) may provide, to a UE 120 (e.g., a receiver device), information identifying mappings of codewords to layers. The information identifying mappings of codewords to layers may be sometimes referred to herein as "mapping information." The mapping information may indicate particular data (e.g., particular codewords, portions of codewords, data streams, portions of data streams, etc.) that are to be mapped to a first layer and/or a second layer.

In some aspects, the mapping information may identify a number of first layers and may indicate which layers, of a total number of layers to be received by the UE 120, are first layers. For example, the mapping information may include a bitmap with a length equal to the total number of layers, wherein a particular value indicates that the corresponding layer is a first layer. As another example, the UE 120 may know the total number of layers. The mapping information may identify a number of first layers, and the UE 120 may use a rule to identify which layers, of the total number of layers, are first layers. For example, the UE 120 may determine that the last X layers of the total number of layers are first layers, may determine that the first X layers are first layers, and/or the like (X is an integer).

In some aspects, the UE 120 may determine the mapping of codewords to layers based at least in part on an indication of which layers are first layers, and based at least in part on the total number of layers. For example, the UE 120 may determine whether a particular codeword is to be mapped to one or more first layers and/or one or more second layers based at least in part on the number of first layers or second layers configured for the UE 120 (e.g., based at least in part on a modulation scheme for the particular codeword, based at least in part on a size of the particular codeword, etc.). As a more particular example, assume that the mapping information indicates that the UE 120 is configured for two first layers and three second layers. In that case, the UE 120 may determine that a first codeword is to be mapped to the three second layers (e.g., all of the three second layers) and may determine that a second codeword is to be mapped to the two first layers (e.g., all of the two first layers). Of course, any other mapping of codewords to second layers and/or first layers is contemplated. For example, five second layers and one first layer may be used, wherein one codeword is associated with the first layer and two codewords are associated with the second layers. In such a case, a first codeword may be associated with second layers 1 through 4, a second codeword may be associated with second layer 5, and a third codeword may be associated with the first layer.

In some aspects, the mapping information may include an explicit indication of the mapping of codewords to layers. For example, the mapping information may include a bitmap that identifies a mapping between particular codewords and particular layers. For example, assume that a UE 120 is associated with N layers. In such a case, the mapping information may include one or more bitmaps of length N corresponding to one or more codewords, and each bitmap may include values that indicate layers to which the corresponding codeword is to be mapped.

In some aspects, the mapping information may identify a table entry of a configuration table that identifies mappings between codewords and layers. For example, the configuration table may identify a set of predefined candidate codeword-to-layer associations. In some aspects, the configuration table may further identify composite layer configurations (e.g., modulation constellations, modulation and coding schemes, antenna ports, etc.). In some aspects, the configuration table may be configured using higher-layer signaling, such as a radio resource control (RRC) signal, a media access control (MAC) control element (CE) (MAC-CE), and/or the like. In some aspects, the configuration table may be specified in a standard, such as a 3GPP Technical Specification and/or the like. In some aspects, the mapping information may include control information (e.g., downlink control information (DCI) and/or the like) that identifies which table entry is to be used. In such a case, the UE 120 may identify the mapping of codewords to layers using the table entry and based at least in part on a total number of layers.

An example of such a configuration table, for a case wherein the first data is multiplexed before encoding occurs, is provided below. In the below configuration table, "Value" identifies a value of the mapping information, "First layers" identifies a number of first layers with which the UE 120 is configured, CW is an abbreviation of codeword, and L is an abbreviation of layer. An asterisk after a layer indicates that the identified layer is a first layer.

| Value | First layers | 1-layer | 2-layer | 3-layer | 4-layer |
|---|---|---|---|---|---|
| 0 | 0 | default | default | default | default |
| 1 | 1 | CW1 → L1* | CW1 → L1 CW2 → L2* | CW1 → (L1, L2) CW2 → L3* | CW1 → (L1, L2, L3) CW2 → L4* |
| 2 | 2 | — | CW1 → (L1*, L2*) | CW → L1 CW2 → (L2*, L3*) | CW1 → (L1, L2) CW2 → (L3*, L4*) |

Another example of such a configuration table, for a case wherein the first data is multiplexed after encoding occurs, is provided below. In the below configuration table, "Value" identifies a value of the mapping information, "First layers" identifies a number of first layers with which the UE 120 is configured, CW is an abbreviation of codeword, and L is an abbreviation of layer. An asterisk after a layer indicates that the identified layer is a first layer. In the above configuration table and the below configuration table, the mapping of a codeword to a layer can be in any variation or order of space, frequency, or time.

| Value | First layers | 1-layer | 2-layer | 3-layer | 4-layer |
|---|---|---|---|---|---|
| 0 | 0 | default | default | default | default |
| 1 | 1 | CW1 → L1* | CW1 → (L1, L2*) | CW1 → (L1, L2, L3*) | CW1 → (L1, L2, L3, L4*) |
| 2 | 1 | — | CW1 → L1 CW2 → L2* | CW1 → (L1, L2) CW2 → L3* | CW1 → (L1, L2, L3) CW2 → L4* |
| 3 | 2 | — | CW1 → (L1*, L2*) | CW1 → (L1, L2*, L3*) | CW1 → (L1, L2, L3*, L4*) |

-continued

| Value | First layers | 1-layer | 2-layer | 3-layer | 4-layer |
|---|---|---|---|---|---|
| 4 | 2 | — | — | CW1 → L1 CW2 → (L2*, L3*) | CW1 → (L1, L2) CW2 → (L3*, L4*) |
| 5 | 2 | — | — | CW1 → (L1, L2*) CW2 → L3* | CW1 → (L1, L2, L3*) CW2 → L4* |

As shown by reference number 710, the BS 110 may provide information indicating a fraction of data to be extracted from the first layers by the UE 120. For example, in some aspects, a first layer may include two or more partitions that may be allocated for different UEs 120. The information indicating the fraction may include information identifying a configuration of which partition, of the two or more partitions, is allocated for the UE 120. For example, the information indicating the fraction may include a bitmap, wherein the length of the bitmap is equal to the total number of partitions of a first layer, and a particular value indicates that the corresponding partition is allocated for the UE 120. In some aspects, the partitions of the first layers may be specified by higher-layer signaling or provided in a specification. In some aspects, the information indicating the fraction may be per first layer. For example, a different configuration may be used and signaled for each first layer. In some aspects, the information indicating the fraction may be per codeword. For example, a different configuration may be used and signaled for each codeword. In such a case, the information indicating the fraction may be applied only to the first layers associated with the codeword.

In some aspects, the information indicating the fraction may indicate a table entry of a configuration table, wherein the configuration table may identify allocations of partitions with regard to one or more first layers of the communication. For example, the configuration table may be configured using higher-layer signaling or identified in a specification. One example of such a table is provided below:

| Value | No. of partitions | Partition to be extracted from the first layers |
|---|---|---|
| 0 | — | all |
| 1 | 2 | $1^{st}$ |
| 2 | 2 | $2^{nd}$ |
| 3 | 3 | $1^{st}$ |
| 4 | 3 | $2^{nd}$ |
| 5 | 3 | $3^{rd}$ |
| 6 | 3 | $1^{st}, 2^{nd}$ |
| 7 | 3 | $2^{nd}, 3^{rd}$ |
| 8 | 4 | $1^{st}$ |
| 9 | 4 | $2^{nd}$ |
| 10 | 4 | $3^{rd}$ |
| 11 | 4 | $4^{th}$ |
| 12 | 4 | $1^{st}, 2^{nd}$ |
| 13 | 4 | $3^{rd}, 4^{th}$ |
| 14 | 4 | $1^{st}, 3^{rd}$ |
| 15 | 4 | $2^{nd}, 4^{th}$ |

In some aspects, the mapping information may indicate a modulation constellation of a first layer. For example, the mapping information may identify at least one of a modulation order, a power ratio, or a composite constellation (e.g., a weighted sum of multiple component constellations, which may be defined as a combination of two or more power ratios and/or component constellations). In some aspects, the mapping information may indicate a table entry of a configuration table that identifies modulation constellations for first layers. For example, the configuration table may identify modulation orders, power ratios, and/or composite constellations. An example of such a configuration table is provided below:

| Value | Order | Power ratio | Composite constellation |
|---|---|---|---|
| 0 | 4 (2-bit) | — | QPSK |
| 1 | 16 (4-bit) | — | 16QAM |
| 2 | 16 (4-bit) | r1 | QPSK + r1 * QPSK |
| 3 | 64 (6-bit) | — | 64QAM |
| 4 | 64 (6-bit) | r2 | 16QAM + r2 * QPSK |
| 5 | 64 (6-bit) | r2 | QPSK + r2 * 16QAM |
| 6 | 64 (6-bit) | r3, r4 | QPSK + r3 * QPSK + r4 * QPSK |
| 7 | 64 (6-bit) | r5, r6 | QPSK + r5 * QPSK + r6 * QPSK |

For a codeword solely associated with (e.g., mapped to) one or more first layers, the UE 120 may perform rate-matching and decoding using the modulation constellation indicated for the one or more first layers. For a codeword associated with (e.g., mapped to) first layers and second layers, the UE 120 may perform rate-matching and decoding using the modulation constellation indicated for the one or more first layers, and may use a modulation order of a modulation and coding scheme (MCS) of the codeword for the one or more second layers. QPSK stands for quadrature phase shift keying and QAM stands for quadrature amplitude modulation.

As shown by reference number 715, the BS 110 may provide a mode indicator. The mode indicator may indicate whether the first layer is generated using coded or uncoded bits, as described in more detail elsewhere herein. The UE 120 may decode the first layer of the communication based at least in part on a value of the mode indicator. For example, the UE 120 may selectively perform the operations described in connection with FIG. 4, or the operations described in connection with FIG. 6, based at least in part on a value of the mode indicator.

As shown by reference number 720, the BS 110 may provide a communication to the UE 120. As shown by reference number 725, the communication may include the one or more first layers. As shown by reference number 730, the communication may include one or more second layers. In some aspects, bits of the one or more first layers may be multiplexed according to a particular pattern. In some aspects, the particular pattern may include a localized pattern. For example, assume that the bits N_b of a first layer are evenly divided into N partitions. In such a case, the first N_b/N bits belong the $1^{st}$ part, the (N_b/N+1)-th bit to the (2*N_b/N)-th bit belong to the $2^{nd}$ part, and so on. In some aspects, the particular pattern may include a comb pattern, wherein bits associated with a first layer are divided into N parts of M consecutive bits from each partition. The comb pattern may provide increased diversity and reliability, whereas the localized pattern may provide a higher data rate.

As shown by reference number 735, the UE 120 may perform rate matching or decoding of the communication based at least in part on the information identifying the mapping. For example, the UE 120 may determine the mapping of codewords to layers, as described in more detail above. Using this information, the UE 120 may determine particular first layers (e.g., and/or partitions of first layers), second layers, and/or the like, which the UE 120 is to rate match and/or decode. Additionally, or alternatively, the UE 120 may determine rates of first layers and/or second layers based at least in part on the information identifying the mapping (e.g., based at least in part on the modulation constellations, the partitions assigned for the UE 120, and/or the like). The UE 120 may use this information to perform the operations described in connection with FIGS. 4 and/or 6, above. In this way, flexibility and efficiency of provision of signals including first parts and second parts are improved by providing for signaling or configuration of rate matching or decoding of such signals.

As indicated above, FIG. 7 is provided as an example. Other examples may differ from what is described with respect to FIG. 7.

Figure 8:
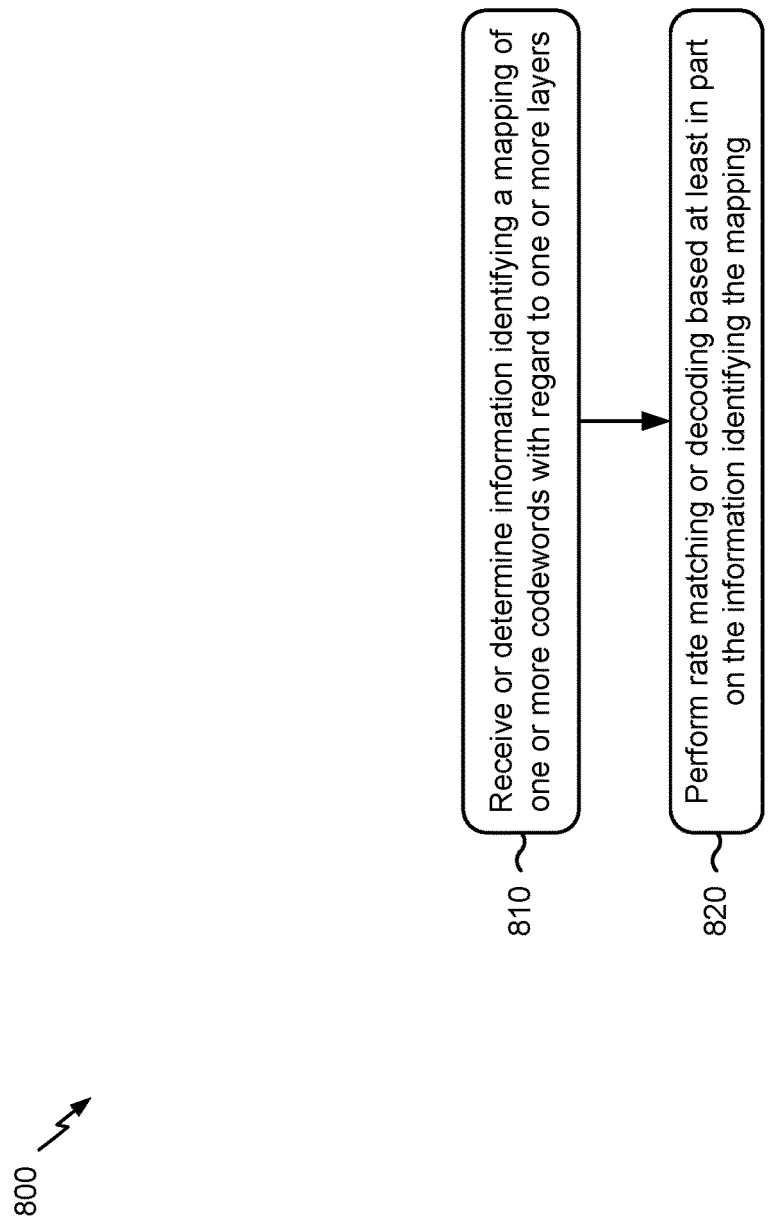
FIG. 8 is a diagram illustrating an example process performed, for example, by a user equipment, in accordance with various aspects of the present disclosure.

FIG. 8 is a diagram illustrating an example process 800 performed, for example, by a UE, in accordance with various aspects of the present disclosure. Example process 800 is an example where a UE (e.g., UE 120, a receiver device, etc.) performs signaling for communication based at least in part on rate splitting using first layers and second layers.

As shown in FIG. 8, in some aspects, process 800 may include receiving or determining information identifying a mapping of one or more codewords with regard to one or more layers (block 810). For example, the UE (e.g., using antenna 252, DEMOD 254, MIMO detector 256, receive processor 258, controller/processor 280, and/or the like) may receive or determine information identifying a mapping of one or more codewords with regard to one or more layers (e.g., a second layer and/or a first layer). In some aspects, the one or more layers include a first set of layers (e.g., at least one first layer) wherein a fraction of bits associated with each layer, of the first set of layers, is for data associated with the UE. The first set of layers may comprise one or more layers. In some aspects, the first set of layers may be one or more common layers. In some aspects, the one or more layers may include a second set of layers (e.g., at least one second layer) wherein all bits associated with each layer, of the second set of layers, are for data associated with the UE. The second set of layers may comprise one or more layers. In some aspects, the second set of layers may be one or more private layers or UE-specific layers.

As shown in FIG. 8, in some aspects, process 800 may include performing rate matching or decoding based at least in part on the information identifying the mapping (block 820). For example, the UE (e.g., using controller/processor 240, controller/processor 280, and/or the like) may perform rate matching or decoding based at least in part on the information identifying the mapping. In some aspects, the UE may perform one or more of the operations described in connection with FIGS. 4 and/or 6 to perform rate matching or decoding, as described in more detail elsewhere herein.

Process 800 may include additional aspects, such as any single aspect or any combination of aspects described below and/or in connection with one or more other processes described elsewhere herein.

In a first aspect, the information identifying the mapping includes a mode indicator that indicates at least one of: whether the one or more layers include at least one layer of the first set of layers, or whether a fraction of bits associated with at least one layer, of the first set of layers, is a fraction of total coded bits associated with codewords mapped to the at least one layer of the first set of layers, or a fraction of uncoded bits associated with the at least one layer of the first set of layers.

In a second aspect, alone or in combination with the first aspect, the UE may determine the mapping based at least in part on the mode indicator and a number of layers of the one or more layers. In a third aspect, alone or in combination with one or more of the first through second aspects, the information identifying the mapping indicates a configuration of the one or more layers, wherein the configuration indicates at least one of: a number of layers of the first set of layers, or which layers, of the one or more layers, belong to the first set of layers.

In a fourth aspect, alone or in combination with one or more of the first through third aspects, the configuration further comprises a bitmap, wherein a length of the bitmap is equal to a total number of layers of the one or more layers, and wherein a bit value of the bitmap indicates whether a corresponding layer belongs to the first set of layers.

In a fifth aspect, alone or in combination with one or more of the first through fourth aspects, the configuration further comprises a value indicating the number of layers of the first set of layers, and a configured number of layers of the one or more layers are determined to belong to the first set of layers. In a sixth aspect, alone or in combination with one or more of the first through fifth aspects, the UE may determine the mapping based at least in part on the configuration. In a seventh aspect, alone or in combination with one or more of the first through sixth aspects, the one or more codewords are to be mapped to the second set of layers based at least in part on a number of layers of the second set of layers.

In an eighth aspect, alone or in combination with one or more of the first through seventh aspects, the one or more codewords are to be mapped to the first set of layers based at least in part on a number of layers of the first set of layers. In a ninth aspect, alone or in combination with one or more of the first through eighth aspects, the information identifying the mapping includes one or more values that explicitly identify the mapping.

In a tenth aspect, alone or in combination with one or more of the first through ninth aspects, the one or more values further comprise a bitmap, wherein the bitmap indicates a set of layers associated with a particular codeword, wherein a length of the bitmap is equal to a total number of layers of the set of layers, wherein a bit of the bitmap of a particular value indicates that a corresponding layer, of the set of layers, is associated with the particular codeword, and wherein the set of layers includes at least one layer of the first set of layers or the second set of layers.

In an eleventh aspect, alone or in combination with one or more of the first through tenth aspects, the one or more values further comprise a codeword-to-layer mapping selected from a plurality of possible codeword-to-layer mappings that are specified in a specification or signaled to the UE. In a twelfth aspect, alone or in combination with one or more of the first through eleventh aspects, the codeword-to-layer mapping indicates which layers, of a set of layers mapped to a particular codeword, belong to the first set of layers. In a thirteenth aspect, alone or in combination with one or more of the first through twelfth aspects, the UE may determine the mapping based at least in part on the one or more values that explicitly identify the mapping.

In a fourteenth aspect, alone or in combination with one or more of the first through thirteenth aspects, the information identifying the mapping indicates one or more fractions of bits to be extracted from at least one layer of the first set of layers. In a fifteenth aspect, alone or in combination with one or more of the first through fourteenth aspects, a particular fraction, of the one or more fractions, is associated with a particular layer of the first set of layers.

In a sixteenth aspect, alone or in combination with one or more of the first through fifteenth aspects, a particular fraction, of the one or more fractions, is associated with a particular codeword of the one or more codewords, and the particular fraction is used for all layers, of the first set of layers, associated with the particular codeword.

In a seventeenth aspect, alone or in combination with one or more of the first through sixteenth aspects, a particular fraction, of the one or more fractions, is indicated using at least one of a bitmap, an explicit configuration, or a configured table. In an eighteenth aspect, alone or in combination with one or more of the first through seventeenth aspects, a length of the bitmap is equal to a total number of partitions of the at least one layer of the first set of layers, wherein a value in the bitmap indicates that a corresponding partition of the total number of partitions is to be extracted, and wherein a configuration of the corresponding partition is specified in a specification or signaled to the UE.

In a nineteenth aspect, alone or in combination with one or more of the first through eighteenth aspects, entries of the configured table indicate a total number of partitions of the at least one layer of the first set of layers and which partition is to be extracted, wherein a configuration of the total number of partitions is specified in a specification or signaled to the UE, and wherein the particular fraction is configured in accordance with an entry of the configured table.

In a twentieth aspect, alone or in combination with one or more of the first through nineteenth aspects, the information identifying the mapping is received in association with information indicating one or more constellations for at least one layer of the first set of layers. In a twenty-first aspect, alone or in combination with one or more of the first through twentieth aspects, the information indicating the constellation indicates at least one of: a modulation order for the at least one layer of the first set of layers, component constellations for the at least one layer of the first set of layers, or a power ratio for a component constellation for the at least one layer of the first set of layers.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a base station, in accordance with various aspects of the present disclosure. Example process 900 is an example where a base station (e.g., base station 110 and/or the like) performs operations associated with signaling regarding rate splitting using first layers and second layers.

As shown in FIG. 9, in some aspects, process 900 may include transmitting or determining information identifying a mapping of one or more codewords with regard to one or more layers for a UE (block 910). For example, the base station (e.g., using controller/processor 240, transmit processor 220, TX MIMO processor 230, MOD 232, antenna 234, and/or the like) may transmit or determine information identifying a mapping of one or more codewords with regard to one or more layers for a user equipment (UE), as described above. In some aspects, the one or more layers include at least one of: a first set of layers, wherein a fraction of bits associated with each layer, of the first set of layers, is for data associated with the UE, or a second set of layers, wherein all bits associated with each layer, of the second set of layers, are for data associated with the UE.

As further shown in FIG. 9, in some aspects, process 900 may include transmitting a communication based at least in part on the one or more codewords and using at least one of the one or more layers (block 920). For example, the base station (e.g., using transmit processor 220, receive processor 238, controller/processor 240, memory 242, and/or the like) may transmit a communication based at least in part on the one or more codewords and using at least one of the one or more layers, as described above.

Process 900 may include additional aspects, such as any single implementation or any combination of aspects described below and/or in connection with one or more other processes described elsewhere herein.

In a first aspect, the information identifying the mapping includes a mode indicator that indicates at least one of: whether the one or more layers include at least one layer of the first set of layers, or whether a fraction of bits associated with at least one layer, of the first set of layers, is a fraction of total coded bits associated with codewords mapped to the at least one layer of the first set of layers, or a fraction of uncoded bits associated with the at least one layer of the first set of layers.

In a second aspect, alone or in combination with the first aspect, the information identifying the mapping indicates a configuration of the one or more layers, wherein the configuration indicates at least one of a number of layers of the first set of layers, or which layers, of the one or more layers, belong to the first set of layers.

In a third aspect, the first aspect and/or the second aspect described in connection with process 900 may be combined with any one or more of the first through twenty-first combinations described in connection with process 800, above.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations are contemplated in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of aspects. In fact, many of these features may be combined in ways not specifically recited in the claims and/or disclosed in the specification. Although each dependent claim listed below may directly depend on only one claim, the disclosure of aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
receiving or determining information identifying a mapping of one or more codewords with regard to one or more layers,
wherein the one or more layers include at least one of:
a first set of layers, wherein a fraction of bits associated with each layer, of the first set of layers, is for data associated with the UE, or
a second set of layers, wherein all bits associated with each layer, of the second set of layers, are for data associated with the UE; and
performing rate matching or decoding based at least in part on the information identifying the mapping.

2. The method of claim 1, wherein the information identifying the mapping includes a mode indicator that indicates at least one of:
whether the one or more layers include at least one layer of the first set of layers, or
whether a fraction of bits associated with at least one layer, of the first set of layers, is a fraction of total coded bits associated with codewords mapped to the at least one layer of the first set of layers, or a fraction of uncoded bits associated with the at least one layer of the first set of layers.

3. The method of claim 2, further comprising:
determining the mapping based at least in part on the mode indicator and a number of layers of the one or more layers.

4. The method of claim 1, wherein the information identifying the mapping indicates a configuration of the one or more layers, wherein the configuration indicates at least one of:
a number of layers of the first set of layers, or
which layers, of the one or more layers, belong to the first set of layers.

5. The method of claim 4, wherein the configuration further comprises a bitmap, wherein a length of the bitmap is equal to a total number of layers of the one or more layers, and wherein a bit value of the bitmap indicates whether a corresponding layer of the one or more layers belongs to the first set of layers.

6. The method of claim 4, wherein the configuration further comprises a value indicating the number of layers of the first set of layers, and wherein a configured number of layers of the one or more layers are determined to belong to the first set of layers.

7. The method of claim 4, further comprising:
determining the mapping based at least in part on the configuration.

8. The method of claim 1, wherein the one or more codewords are to be mapped to the second set of layers based at least in part on a number of layers of the second set of layers.

9. The method of claim 1, wherein the one or more codewords are to be mapped to the first set of layers based at least in part on a number of layers of the first set of layers.

10. The method of claim 1, wherein the information identifying the mapping includes one or more values that explicitly identify the mapping.

11. The method of claim 10, wherein the one or more values further comprise a bitmap, wherein the bitmap indicates a set of layers associated with a particular codeword, wherein a length of the bitmap is equal to a total number of layers of the set of layers, wherein a bit of the bitmap of a particular value indicates that a corresponding layer, of the set of layers, is associated with the particular codeword, and wherein the set of layers includes at least one layer of the first set of layers or the second set of layers.

12. The method of claim 10, wherein the one or more values further comprise a codeword-to-layer mapping selected from a plurality of possible codeword-to-layer mappings that are specified in a specification or signaled to the UE.

13. The method of claim 12, wherein the codeword-to-layer mapping indicates which layers, of a set of layers mapped to a particular codeword, belong to the first set of layers.

14. The method of claim 10, further comprising:
determining the mapping based at least in part on the one or more values that explicitly identify the mapping.

15. The method of claim 1, wherein the information identifying the mapping indicates one or more fractions of bits to be extracted from at least one layer of the first set of layers.

16. The method of claim 15, wherein a particular fraction, of the one or more fractions, is associated with a particular layer of the first set of layers.

17. The method of claim 16, wherein a particular fraction, of the one or more fractions, is associated with a particular codeword of the one or more codewords, and wherein the particular fraction is used for all layers, of the first set of layers, associated with the particular codeword.

18. The method of claim 15, wherein a particular fraction, of the one or more fractions, is indicated using at least one of a bitmap, an explicit configuration, or a configured table.

19. The method of claim 18, wherein a length of the bitmap is equal to a total number of partitions of the at least one layer of the first set of layers, wherein a value in the bitmap indicates that a corresponding partition of the total number of partitions is to be extracted, and wherein a configuration of the corresponding partition is specified in a specification or signaled to the UE.

20. The method of claim 18, wherein entries of the configured table indicate a total number of partitions of the at least one layer of the first set of layers and which partition is to be extracted, wherein a configuration of the total number of partitions is specified in a specification or signaled to the UE, and wherein the particular fraction is configured in accordance with an entry of the configured table.

21. The method of claim 1, wherein the information identifying the mapping is received in association with information indicating one or more constellations for at least one layer of the first set of layers.

22. The method of claim 1, wherein the information indicating the constellation indicates at least one of:
a modulation order for the at least one layer of the first set of layers,
component constellations for the at least one layer of the first set of layers, or
a power ratio for a component constellation for the at least one layer of the first set of layers.

23. A user equipment (UE) for wireless communication, comprising:
memory; and
one or more processors operatively coupled to the memory, the memory and the one or more processors configured to:
receive or determine information identifying a mapping of one or more codewords with regard to one or more layers,
wherein the one or more layers include at least one of:
a first set of layers, wherein a fraction of bits associated with each layer, of the first set of layers, is for data associated with the UE, or
a second set of layers, wherein all bits associated with each layer, of the second set of layers, are for data associated with the UE; and
perform rate matching or decoding based at least in part on the information identifying the mapping.

24. The UE of claim 23, wherein the information identifying the mapping includes a mode indicator that indicates at least one of:
whether the one or more layers include at least one layer of the first set of layers, or
whether a fraction of bits associated with at least one layer, of the first set of layers, is a fraction of total coded bits associated with codewords mapped to the at least one layer of the first set of layers, or a fraction of uncoded bits associated with the at least one layer of the first set of layers.

25. The UE of claim 24, wherein the one or more processors are further to:
determine the mapping based at least in part on the mode indicator and a number of layers of the one or more layers.

26. The UE of claim 23, wherein the information identifying the mapping indicates a configuration of the one or more layers, wherein the configuration indicates at least one of:
a number of layers of the first set of layers, or
which layers, of the one or more layers, belong to the first set of layers.

27. A method of wireless communication performed by a base station, comprising:
transmitting or determining information identifying a mapping of one or more codewords with regard to one or more layers for a user equipment (UE),
wherein the one or more layers include at least one of:
a first set of layers, wherein a fraction of bits associated with each layer, of the first set of layers, is for data associated with the UE, or
a second set of layers, wherein all bits associated with each layer, of the second set of layers, are for data associated with the UE; and
transmitting a communication based at least in part on the one or more codewords and using at least one of the one or more layers.

28. The method of claim 27, wherein the information identifying the mapping includes a mode indicator that indicates at least one of:
whether the one or more layers include at least one layer of the first set of layers, or
whether a fraction of bits associated with at least one layer, of the first set of layers, is a fraction of total coded bits associated with codewords mapped to the at least one layer of the first set of layers, or a fraction of uncoded bits associated with the at least one layer of the first set of layers.

29. The method of claim 27, wherein the information identifying the mapping indicates a configuration of the one or more layers, wherein the configuration indicates at least one of:
a number of layers of the first set of layers, or
which layers, of the one or more layers, belong to the first set of layers.

30. A base station for wireless communication, comprising:
memory; and
one or more processors operatively coupled to the memory, the memory and the one or more processors configured to:
transmit or determine information identifying a mapping of one or more codewords with regard to one or more layers for a user equipment (UE),
wherein the one or more layers include at least one of:
a first set of layers, wherein a fraction of bits associated with each layer, of the first set of layers, is for data associated with the UE, or
a second set of layers, wherein all bits associated with each layer, of the second set of layers, are for data associated with the UE; and
transmit a communication based at least in part on the one or more codewords and using at least one of the one or more layers.

* * * * *